United States Patent
Martin et al.

(10) Patent No.: US 11,022,049 B1
(45) Date of Patent: Jun. 1, 2021

(54) METHOD FOR KNOCK MITIGATION

(71) Applicant: Ford Global Technologies, LLC, Dearborn, MI (US)

(72) Inventors: Douglas Raymond Martin, Canton, MI (US); John Eric Rollinger, Troy, MI (US); Tyler Kelly, Plymouth, MI (US); Julia Helen Buckland Seeds, Commerce Township, MI (US); Joshua Schumaker, Dearborn, MI (US); Adam J. Richards, Royal Oak, MI (US); Joseph Lyle Thomas, Farmington Hills, MI (US); John Erik Mikael Hellstrom, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/919,468

(22) Filed: Jul. 2, 2020

(51) Int. Cl.
| | |
|---|---|
| *F02D 13/02* | (2006.01) |
| *F02D 41/00* | (2006.01) |
| *F02D 41/14* | (2006.01) |
| *F02P 5/145* | (2006.01) |
| *F01L 13/00* | (2006.01) |
| *F02D 41/38* | (2006.01) |

(52) U.S. Cl.
CPC ...... *F02D 13/0226* (2013.01); *F01L 13/0015* (2013.01); *F02D 41/0002* (2013.01); *F02D 41/1498* (2013.01); *F02D 41/38* (2013.01); *F02P 5/145* (2013.01); *F02D 2041/002* (2013.01)

(58) Field of Classification Search
CPC ............ F02D 13/0226; F02D 41/1498; F02D 41/0002; F02D 41/38; F02D 2041/002; F01L 13/0015; F02P 5/145
See application file for complete search history.

(56) References Cited

U.S. PATENT DOCUMENTS

| | | | |
|---|---|---|---|
| 7,028,670 | B2 | 4/2006 | Doering |
| 7,213,566 | B1 | 5/2007 | Jankovic |
| 9,103,290 | B2 | 8/2015 | Ryu et al. |
| 2012/0322614 | A1* | 12/2012 | Cunningham ...... F02D 41/0007 477/54 |
| 2016/0208730 | A1* | 7/2016 | Uchida ................... F02B 75/12 |

FOREIGN PATENT DOCUMENTS

| | | |
|---|---|---|
| DE | 102006029279 B3 | 10/2007 |
| JP | 4363171 B2 | 11/2009 |
| RU | 2573093 C2 | 1/2016 |

* cited by examiner

*Primary Examiner* — Joseph J Dallo
(74) *Attorney, Agent, or Firm* — Geoffrey Brumbaugh; McCoy Russell LLP (57) ABSTRACT

Methods and systems are provided for controlling engine knock. In one example, a method may include decreasing intake valve lift at a first set of cylinders where knock is indicated and increasing intake valve lift at a second set of cylinders where knock is not indicated. A stoichiometric air-to-fuel ratio is thereby maintained.

20 Claims, 5 Drawing Sheets

METHOD FOR KNOCK MITIGATION

FIELD

The present description relates generally to methods and systems for mitigating engine knock.

BACKGROUND/SUMMARY

Engine knock is caused by spontaneous combustion of an air/fuel mixture in an engine cylinder (e.g., combustion chamber) outside of a combustion front from an ignition event (e.g., from a spark plug). As an example, carbon buildup within the cylinder may increase a compression ratio of the cylinder, resulting in an increased propensity for knock. A knock sensor may be utilized to identify knock so that an engine controller may employ various strategies to mitigate knock, such as by adjusting (e.g., retarding) a spark timing. However, retarding the spark timing may lead to wasted fuel and degraded fuel economy of a vehicle.

Attempts to address knock mitigation without adversely affecting fuel economy include configuring an engine with continuously variable valve lift (CVVL). One example approach is shown by Ryu et al. in U.S. Pat. No. 9,103,290. Therein, the engine determined to be in a predetermined control state when the engine is in an idle state and an oil temperature is within predetermined range. In the control state, when an error is detected to occur beyond a threshold period of time, the engine is switched to a predetermined passive state where the valve lift is in a predetermined low lift state. The error may be a state where the intake cam is unable to be advanced, e.g., when the RPM of the engine and the oil pressure are low. By adjusting the engine to the passive state during the error, knock may be circumvented, resulting in a decreased compression ratio.

However, the inventors herein have recognized potential issues with such systems. As one example, the approach of the '290 patent does not address knock mitigation during high engine loads. During high load engine operation, the engine may be more prone to knock. Furthermore, decreasing valve lift during high load operation may inhibit an ability of the engine to meet a torque demand.

In one example, the issues described above may be addressed by a method comprising decreasing intake valve lift at a first set of cylinders of an engine where knock is detected and increasing intake valve lift at a second set of cylinders of the engine where knock is not detected. In this way, engine performance and a fuel economy of the vehicle may be maintained.

As one example, a loss of torque resulting from decreasing intake valve lift at the first set of cylinders, where knock is detected, may be offset by increasing intake valve lift at the second set of cylinders. In instances where increasing intake valve lift does not provide sufficient torque to meet a torque demand, mitigating actions may be performed, including adjusting gearing in a hybrid electric vehicle to increase engine rotation. In addition, an amount of fuel injected at the first set of cylinders may be adjusted according to the decrease in intake air delivered to the first set of cylinders, thus maintaining a stoichiometric air-to-fuel ratio at the engine and circumventing fuel waste.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 is shown approximately to scale.

DETAILED DESCRIPTION

Figure 1:
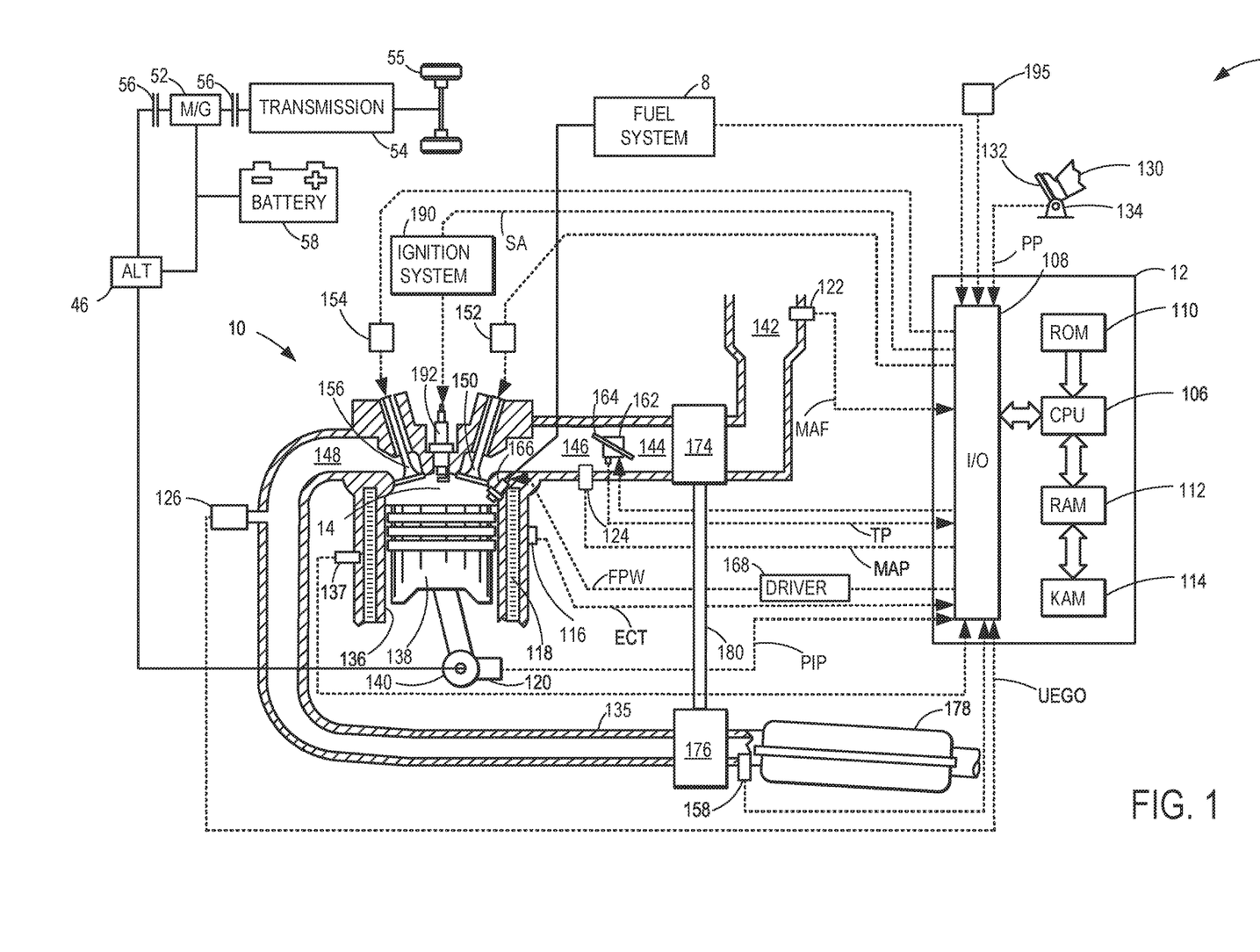
FIG. 1 shows an example of an engine in which a continuously variable valve lift (CVVL) mechanism may be implemented.
Figure 2:
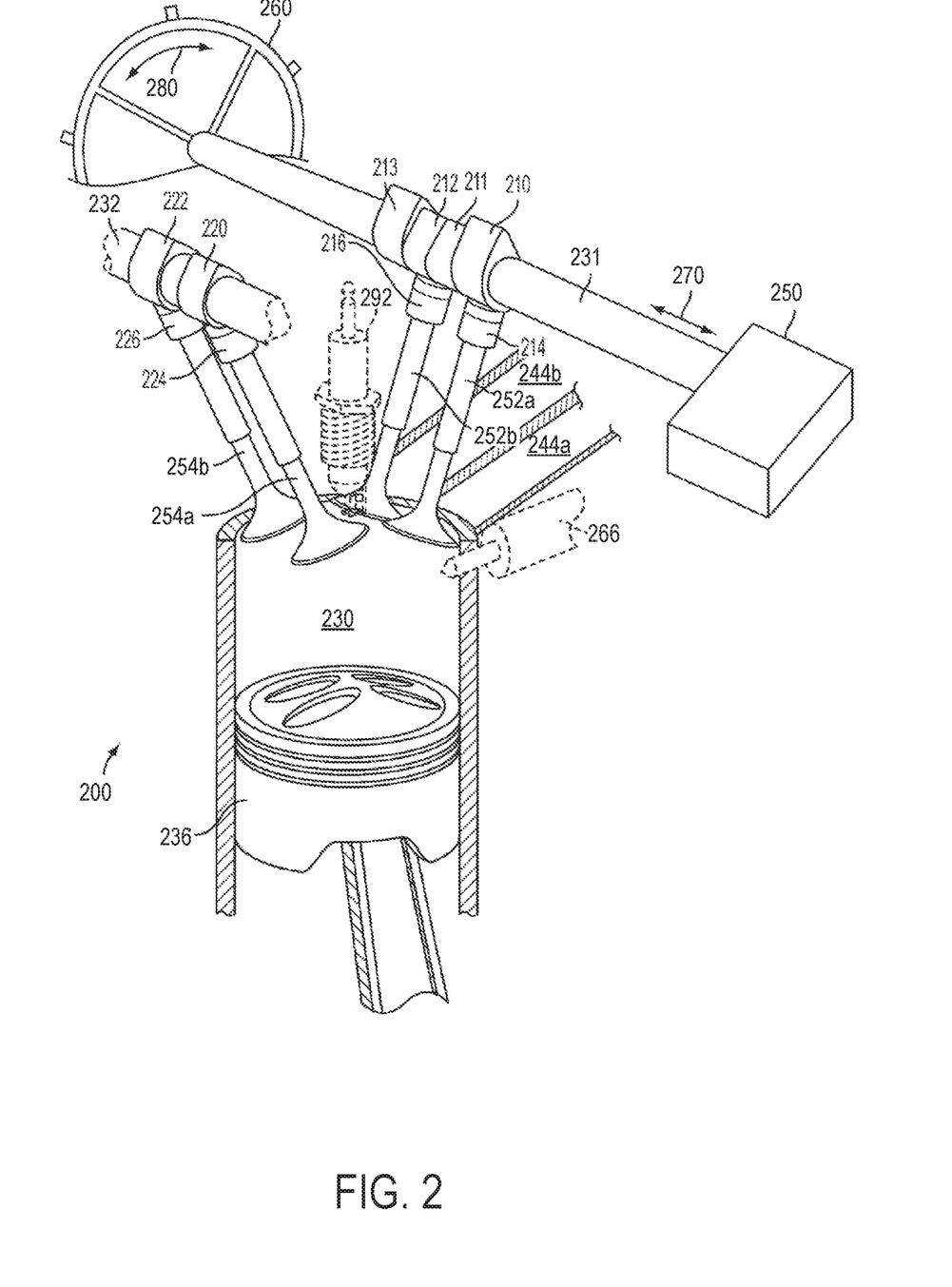
FIG. 2 shows an alternate view of the example engine of FIG. 1.
Figure 3:
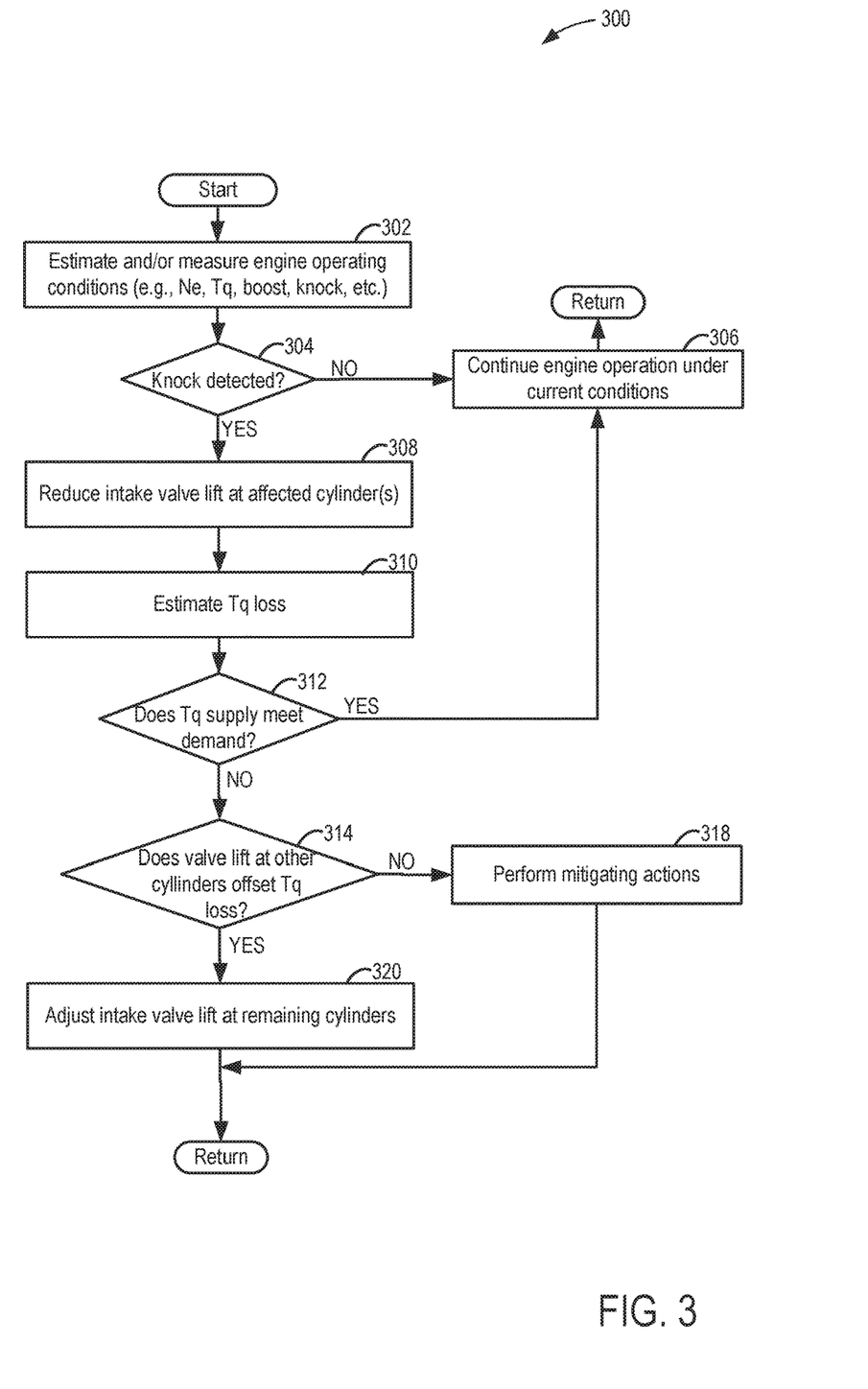
FIG. 3 shows an example of a method for controlling knock in an engine adapted with the CVVL mechanism.
Figure 4:
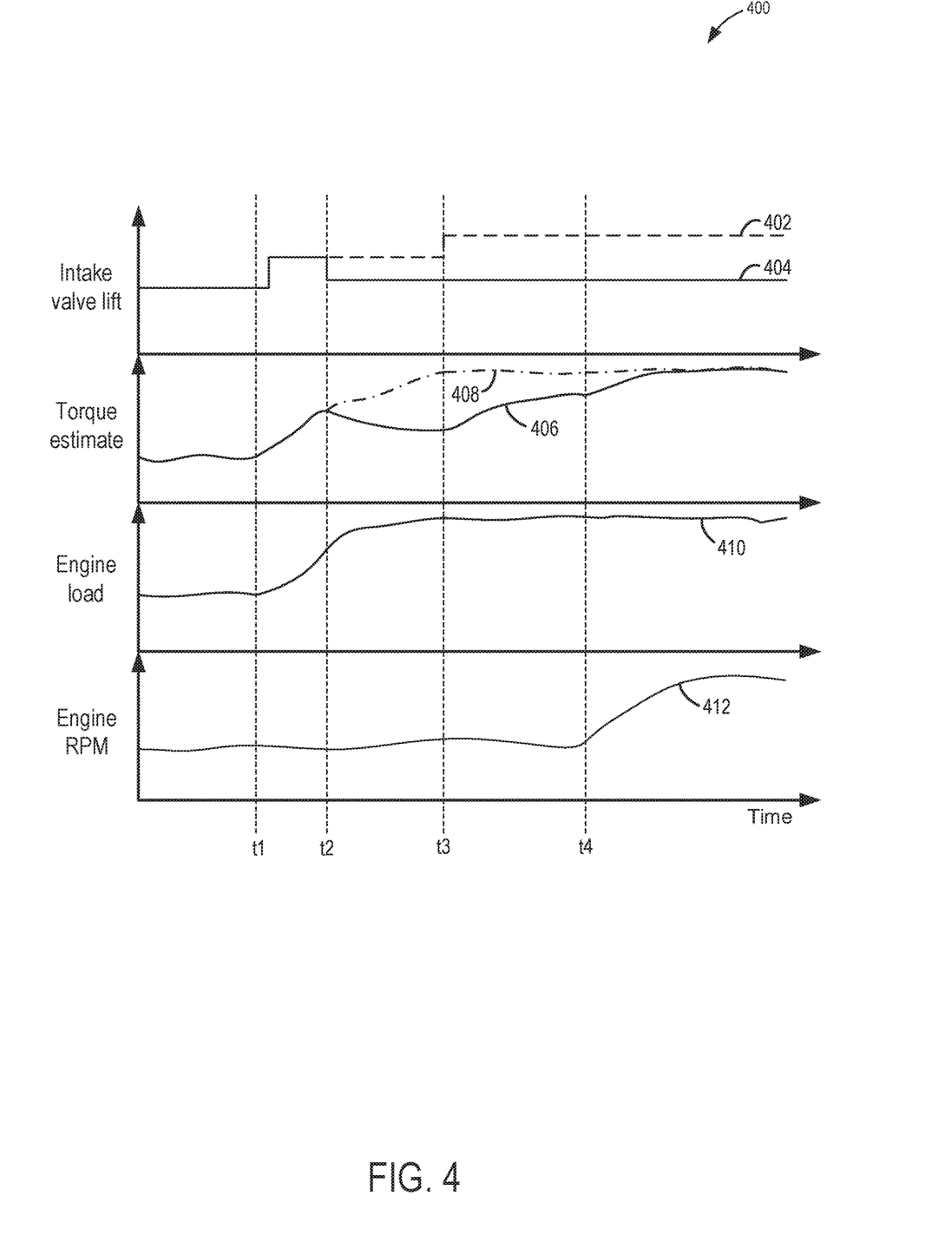
FIG. 4 shows a first graph illustrating changes in engine operating parameters during operation of an engine adapted with the CCVL mechanism.
Figure 5:
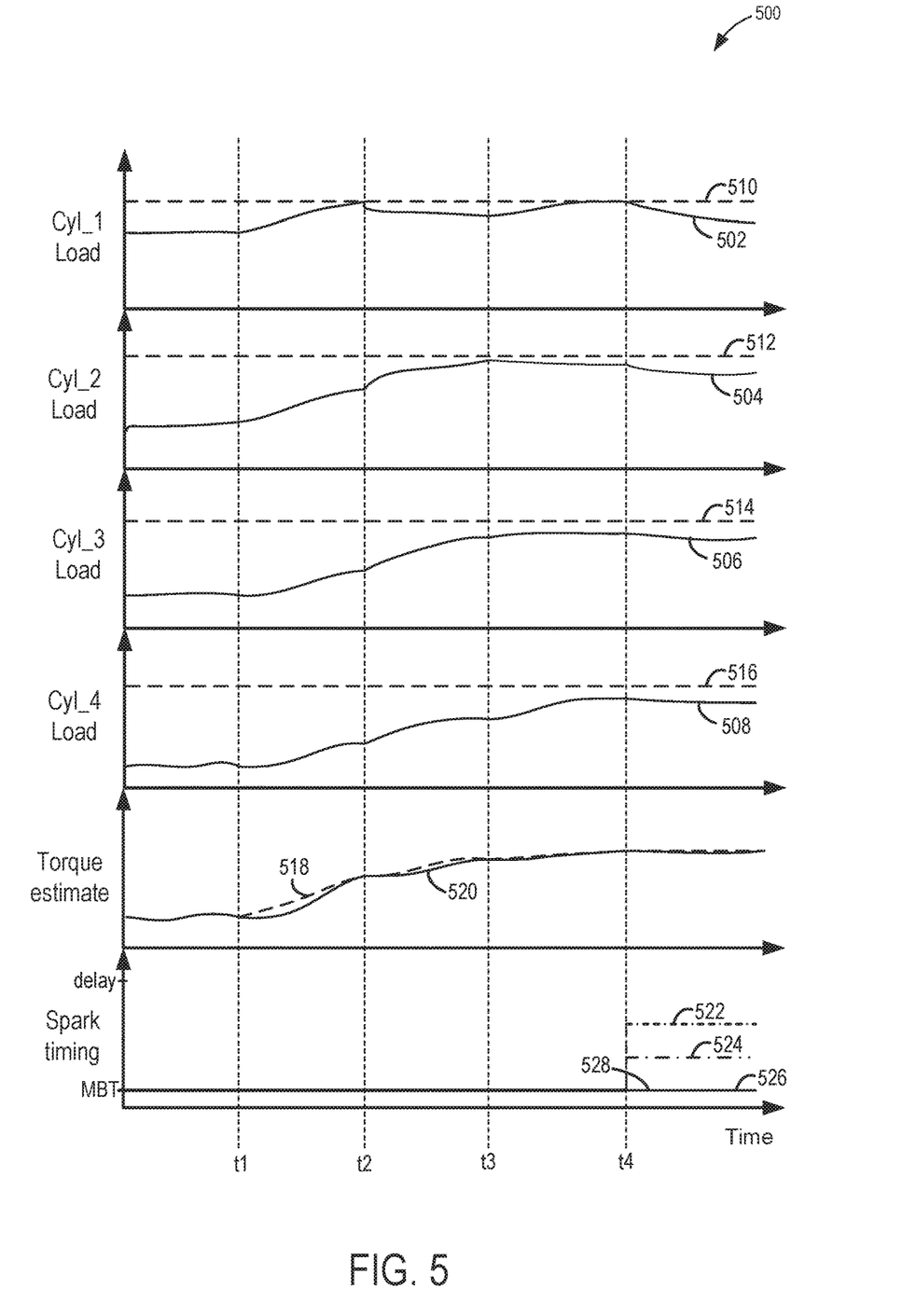
FIG. 5 shows a second graph illustrating changes in engine operating parameters during operation of an engine adapted with the CCVL mechanism.

The following description relates to systems and methods for engine knock mitigation. The engine may include one or more cylinders, as shown in FIGS. 1 and 2. The engine may be adapted with a continuously variable valve lift (CVVL) mechanism to allow engine valves to be lifted by different amounts according to engine conditions. The variable lifting enables an amount of air delivered to each of the cylinders to be controlled based on the amount of lift. By selectively varying the amount of air flowed to each of the cylinders, ignition beyond a flame front may be circumvented at cylinders where knock is detected while compensating for loss of torque. An example of a method for leveraging the CVVL mechanism to mitigate knock is shown in FIG. 3. Various engine operations may be adjusted during knock mitigation, as depicted in FIGS. 4 and 5.

Turning to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutch 56 is engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 140 while the engine 10 is running. In addition, alternator 46 may power one or more electrical systems of the engine, such as one or more auxiliary systems, including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based on system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from the engine, and exhaust turbine 176 may be optionally omitted. In still other examples, engine 10 may be provided with an electric supercharger (e.g., an "eBooster"), and compressor 174 may be driven by an electric motor.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder, as shown in FIG. 2. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems, described further below with reference to FIG. 2, that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples, the compression ratio may be increased when different fuels are used. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed and engine load, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and may be further configured to inject this fuel mixture directly into cylinder 14. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Engine 10 may further include one or more knock sensors coupled to each cylinder 14 for identifying abnormal cylinder combustion events, such as knock sensor 137 shown in FIG. 1. In other examples, one or more knock sensors may be coupled to selected locations of the engine block. In some examples, knock sensor 137 may be an accelerometer coupled to the cylinder block. In another example, knock sensor 137 may be an ionization sensor configured in the spark plug of each cylinder. The output of knock sensor 137 may be used to indicate an abnormal combustion event in cylinder 14 and the rest of the cylinders included in engine 10.

In response to an indication of knock, a mitigating action may be applied. For example, knock may be addressed using spark retard and/or EGR. For example, spark timing may be retarded from MBT as a knocking intensity increases. However, as spark timing is retarded, fuel injected at the cylinder 14 may be wasted, degrading a fuel economy of the vehicle 5. As an alternative to spark retard, a likelihood of knock may be reduced, in one example, by adjusting an amount of air delivered through one or more intake valves to one or more of the cylinders where knock is detected. When a CVVL mechanism is implemented, adjustment of intake air at the cylinder may be achieved by moderating an amount of lift of the intake valve. An amount of fuel injected at the cylinder may therefore be decreased in order to maintain stoichiometry. Furthermore, CVVL may enable an amount of air delivered to other cylinders, where knock is not detected, to be increased to provide sufficient torque to meet a demand for power when engine loads are high. Further details of knock mitigation via cylinder load control are provided further below, with reference to FIGS. 3-4.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a profile ignition pickup signal (PIP) from a Hall effect sensor 120 (or other type) coupled to crankshaft 140; a throttle position signal (TP) from a throttle position sensor; signal UEGO from exhaust gas sensor 126, which may be used by controller 12 to determine the AFR of the exhaust gas; the knock signal from knock sensor 137; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1, processes the received signals, and employs the various actuators of FIG. 1 (e.g., fuel injector 166 and spark plug 192) to adjust engine operation based on the received signals and instructions stored on a memory of the controller. For example, the controller may receive an indication of knock from knock sensor 137 and vary an amount of lift at the intake valve 150 via a CVVL system to reduce an amount of air delivered to the cylinder 14. An amount of fuel injected at the cylinder 14, e.g., by the fuel injector 166 may be adjusted accordingly.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In a multi-cylinder engine, a CVVL mechanism may be used to vary a height of valve lift at intake and exhaust valves of the engine cylinders to, for example, increase a performance and fuel economy of a vehicle while decreasing emissions. As an example, as shown in FIG. 2, valve lift may be varied at each cylinder, thereby adjusting a load at each cylinder independently. A detailed view of a cylinder 230, including a piston 236, of an engine 200 is shown communicating with intake manifolds 244a and 244b via intake valves 252a and 252b, respectively. In one example, the engine 200 may be similarly configured to the engine 10 of FIG. 1. In some embodiments, exhaust valves 254a and 254b may share a common exhaust manifold, which has been omitted in FIG. 2. Combustion chamber 230 may also include a spark plug 292 and a fuel injector 266 for delivering fuel directly to the combustion chamber. However, in alternate embodiments, the combustion chamber may not include spark plug 292 and/or direct fuel injector 266.

Further, FIG. 2 shows how intake valves 252a and 252b may be actuated by a common camshaft 231 and exhaust valves 254a and 254b may be actuated by a common camshaft 232. However, in an alternate embodiment, at least one of the intake valves and/or exhaust valves may be actuated by its own independent camshaft or other device. Camshaft 231 is shown including two cam profiles per valve, where intake valve 252a may be actuated by cam lobes having profiles 210 and 211 via tappet 214 and intake valve 252b may be actuated by cam lobes having profiles 212 and 213 via tappet 216. Camshaft 232 is shown with a single cam lobe 220 coupled to exhaust valve 254a via tappet 224 and a single cam lobe 222 coupled to exhaust valve 254b via tappet 226. While this example shows an overhead cam engine with a tappet coupled to the valve stems, tappets may also be used with a pushrod engine.

As shown in FIG. 2, cam profile 210 may be larger and thus provides greater lift to intake valve 252a than cam profile 211. Similarly, cam profile 213 may be larger and thus provide greater lift to intake valve 252b than cam profile 212. In this manner, shaft 231 may be configured with a cam profile switching (CPS) device 250 that enables camshaft 231 to translate longitudinally, as indicated by arrow 270, thereby causing operation of intake valve 252a to vary between cam profiles 210 and 211, and intake valve 252b to vary between cam profiles 212 and 213. However, other configurations may be used to enable CPS device 250 to switch valve control between two or more cam profiles. For example, a switchable tappet may be used for varying valve control between two or more cam profiles.

Camshafts 231 and 232 may also include a variable cam timing (VCT) device 260 configured to vary the timing of valve opening and closing events by varying the relationship between the crank shaft position and the camshaft position. For example, VCT device 260 may be configured to rotate camshaft 231, as indicated by arrow 280, independently of the crank shaft to cause the valve timing to be advanced or retarded. In some embodiments, VCT device 260 may be a cam torque actuated device configured to rapidly vary the cam timing. In some embodiments, valve timing such as intake valve closing (IVC) may be varied by a continuously variable valve lift (CVVL) device. While not shown in FIG. 2, in some embodiments, camshaft 232 may also include a CPS device and/or VCT device for varying the operation of exhaust valves 254a and 254b.

Further, cam profiles 210 and 211 are shown arranged such that as camshaft 231 is translated longitudinally in a first direction (e.g. via the CPS device), cam profiles 210 and 212 may be aligned with the corresponding tappets to control the operation of intake valves 252a and 252b, respectively. Similarly, as camshaft 231 is translated longitudinally in an opposite direction via the CPS device, cam profiles 211 and 213 control the operation of intake valves 252a and 252b, respectively. In this manner, when intake valve 252a is operated with cam profile 210 having a higher lift and/or longer lift duration than cam profile 211, intake valve 252b may be operated with cam profile 212 having a lower lift and/or shorter lift duration than cam profile 213. Conversely, when intake valve 252a is operated with cam profile 211 having a lower lift and/or shorter lift duration than cam profile 210, intake valve 252b may be operated with cam profile 213 having a higher lift and/or longer lift duration than cam profile 212. As will be described below in greater detail, this configuration of cam profiles can be used to provide control of the initial combined charge temperature and/or the amount of intake air supplied to the combustion chamber, for facilitating transitions between various modes of operation.

While FIG. 2 is described above with reference to one cylinder of engine 200, it should be appreciated that some or all of the other cylinders may be configured as combustion chamber 230. In some embodiments, depending on engine configuration, some or all of the cylinders of engine 200 may share camshaft 231 for controlling the intake valves and camshaft 232 for controlling the exhaust valves. Alternatively, in some embodiments, such as with engines having cylinders arranged in a 'V' configuration, a first camshaft may control the intake valves for a first group or bank of cylinders and a second camshaft may control the intake valves for a second group of cylinders. In this manner, a single CPS device and/or VCT device may be used to control valve operation of a group of cylinders.

As described above, an amount of lift at intake valves of an engine may be continuously varied by a CVVL mechanism. Implementation of the CVVL mechanism may, in one example, be leveraged to mitigate engine knock during high load operation. Knock may occur as result of various uncontrolled conditions, such as humidity, fuel type, engine temperature, etc. Furthermore, select cylinders in a multi-cylinder engine may be more prone to knock than others. Conventionally, knock may be controlled by retarding spark. By delaying spark ignition to a later part of an engine cycle, peak temperature and pressure is reduced, thereby reducing pre-ignition and engine degradation. However, at least a portion of fuel injected at the cylinders may not be combusted and lost as waste, leading to poor fuel economy of the engine.

The CVVL mechanism may be used to adjust air delivered to the cylinders. For example, when knock is detected at one of the cylinders, e.g., by a knock sensor such as the knock sensor 137 of FIG. 1, intake air flowed to the affected cylinder may be immediately reduced by lowering an amount of lift at one or more intake valves of the cylinder. In other words, a load of the cylinder may be decreased in response to detection of knock. Decreasing the cylinder load, e.g., amount of intake air, may decrease the peak pressure without demanding spark ignition delay. As an amount of injected fuel may be adjusted to match the reduced air flow to the cylinder and maintain a desired air/fuel ratio, fuel is not wasted.

Reducing intake valve lift at the cylinder, when knock is detected, during high engine load operation may decrease an amount of torque provided by the engine. In some instances, the torque reduction may inhibit the engine's ability to meet a torque demand. To compensate for the reduced torque resulting from decreased loading at the affected cylinder, air at the other cylinders of the multi-cylinder engine air may be adjusted. For example, the other cylinders may each have individual maximum load thresholds which may be dependent on a rated operating pressure of each cylinder. Lift at intake valves of at least one of the other cylinders may be increased to augment a load at least at one of the other cylinders, offsetting the loss of torque. In some examples, an amount of additional air, equal to an amount of air decreased at the affected cylinder, may be equally split between the other cylinders, when each of the remaining cylinders are below its maximum load threshold. In other examples, when some of the remaining cylinders are carrying loads further below their maximum load thresholds than other cylinders, loads at the remaining cylinders may be increased heterogeneously.

In some instances, increasing intake air delivered to the remaining cylinders (e.g., cylinders where knock is not detected) may not sufficiently compensate for loss of torque, however. For example, loads at the remaining cylinders may be close enough to their respective maximum load thresholds that increasing loads at the remaining cylinders does not fully offset the loss of torque. The loss of torque may be high due to, for example, knock occurring at more than one of the cylinders. When increasing loads at the other cylinders does not provide enough torque to meet the demand, engine rotation may be increased to provide the requested power. For example, in an HEV, a gearing of the HEV may adjusted to increase engine RPMs and deliver additional torque. Adjusting the gearing may include operating an electric motor of the HEV and changing a gear ratio, e.g., downshifting to a lower gear, to increase torque output.

In yet other instances, other mitigating actions may be performed to offset a loss of torque arising from knock control via load adjustment at the cylinders. For example, a position of a throttle in an intake passage, e.g., the throttle 162 of FIG. 1, controlling intake air flow to the cylinders, may be adjusted to increase air delivered to the cylinders and adjust a load point of the cylinders when the cylinders are below their respective maximum load thresholds. Adjusting the throttle may, in turn, allow torque loss to be compensated by increasing intake valve lift at cylinders where knock is not detected. The maximum load thresholds of the cylinders may, in turn, be increased based on pedal-induced (e.g., accelerator pedal) enrichment events which may reduce a combustion temperature in the cylinders. Further mitigating actions may include water injection at the cylinders to reduce cylinder temperature.

In addition, other actions may be conducted in combination to meet the torque demand. For example, fuel enrichment may be performed along with spark retard, each meeting a portion of a torque shortfall. Fuel enrichment and spark retard may be combined with CVVL air actions to meet the torque demand more efficiently than by spark retard alone. Furthermore, in some examples, knock mitigation at the cylinders may be prioritized over torque demand and a small torque shortfall may be accepted in order to circumvent engine degradation, as described further below with respect to FIG. 5.

An example of a method 300 for controlling knock in a multi-cylinder engine is depicted in FIG. 3. The engine may be the engine 10 shown in FIG. 1, configured with more than one cylinder. Each of the cylinders may be similar to the cylinder 230 of FIG. 1, adapted with a CVVL mechanism to vary an amount of lift at intake and exhaust valves of the cylinders. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, the method includes estimating current engine operating conditions such as engine speed based on a PIP signal, torque as estimated based on engine speed and known engine power, boost as determined an intake manifold pressure, knock as provided by a knock sensor, etc. The engine may be operating at high loads. The method includes determining if knock is detected at 304. Knock may be detected at the knock sensor if vibrations at the cylinders exceeds a threshold intensity or a threshold frequency, for example.

If knock is not detected, the method proceeds to 306 to continue engine operation under current conditions. If knock is detected at one or more of the cylinders, the method continues to 308 to identify which cylinder(s) is experiencing knock. The amount of lift of one or more intake valves at the affected cylinder(s) is decreased to reduce loading at the affected cylinder(s), thereby suppressing knock at the affected cylinder(s).

At 310, the method includes estimating a torque loss arising from the decrease in intake valve lift at the affected cylinder(s). The torque loss is used to determine a current amount of torque supplied by the cylinders, including cylinders where intake valve lift is not decreased and the cylinder(s) where knock was detected. The torque supply is compared with a torque demand at 312. If the torque supply does not meet the demand, method 300 continues to 314 to estimate whether increasing intake valve lift at the unaffected cylinders, e.g., cylinders where knock was not detected, provides sufficient additional torque to meet the demand.

Estimating whether increasing loading at the unaffected cylinders allows the torque demand to be met may include determining a load threshold of each of the unaffected cylinders based on a current load point of the cylinders. The current load point may be dependent on a position of a throttle in an intake passage of the engine, the throttle controlling intake air flow to the cylinders. The load threshold of the cylinders may be a maximum amount of loading at the cylinders that does not promote knock. Above the load threshold, the cylinders may be prone to preignition. The load threshold may differ amongst the cylinders, depending on a positioning of the cylinders in the engine and each cylinder may have a different pressure tolerance.

The controller may determine the load threshold of the unaffected cylinders by referring to a look-up table providing relationships between load threshold and current load point. An amount of additional torque provided by increasing loading at the unaffected cylinders, via increasing intake valve lift, without surpassing the load thresholds is estimated and compared to the torque loss. If the amount of additional torque provided by increasing intake valve lift at the unaffected cylinders, without surpassing the cylinder load thresholds, is enough to meet to the torque demand, the method proceeds to 320 to adjust the height of intake valve lift at the unaffected cylinders.

Adjusting the height of intake valve lift may include increasing lift at each of the cylinders homogeneously, e.g., by an equal lift height, if the cylinder loads are similarly below the load thresholds. Alternatively, the load thresholds may vary amongst the unaffected cylinders and the current load points of the cylinders may be offset from their respective load thresholds by different amounts. As such, intake valve lift may be adjusted heterogeneously amongst the cylinders, e.g., an increase in intake valve lift at one cylinder may be greater than an increase in intake valve lift at another cylinder. The controller may reference look-up tables providing information regarding load points and load thresholds for specific cylinders and allocate increases in intake valve lift accordingly so that loads at the cylinders are maintained below their respective load thresholds. The method returns to the start.

Returning to 312, if the torque supply, after accounting for losses due to decreased intake valve lift at the affected cylinder(s), is still sufficient to meet the torque demand, the method continues to 306 to continue operation under the current conditions and with the reduced intake valve lift at the affected cylinder(s). The method returns to the start.

Returning to 314, if the estimated increase in torque arising from increasing intake valve lift at the unaffected cylinders does not meet the torque demand, the method proceeds to 318 to perform other mitigating actions in addition to increasing intake valve lift at the unaffected cylinders. The mitigating actions may include, for example, varying a throttle position to adjust cylinder load points, thereby changing the cylinder load thresholds, fuel enrichment, and water injection. In one example, when the vehicle is a HEV, a gearing system of the HEV may be moderated to raise the engine revolutions per minutes (RPMs) and provide additional power to supplement the torque shortfall. In another example, spark ignition may be retarded to decrease a compression ratio at the cylinders if knock at the unaffected cylinders is determined to be eminent or if knock is detected at all cylinders. Pre-emptive circumvention of knock may be prioritized over torque compensation in such instances. The method returns to the start.

Turning to FIG. 4, operations of a multi-cylinder engine of an HEV adapted with CVVL are shown in graph 400. Specifically, graph 400 depicts an amount of lift at a first set of cylinders at plot 402 and an amount of lift at a second set of cylinders at plot 404. The first and second set of cylinders may each include one or more cylinders and may be differentiated by the first set of cylinders being more prone to knock than the second set of cylinders. Graph 400 further includes estimated torque supply at plot 406, as determined by loading at the first and second set of cylinders, estimated torque demand at plot 408, as determined by engine load and operator input (e.g., depression of an accelerator pedal), engine load at plot 410, and engine RPM at plot 412, where engine rotation is controlled by adjusting gearing in the HEV. Time is plotted along the horizontal axis.

Prior to t1, intake valves at the first and second sets of cylinders (as shown at plots 402 and 404) are lifted to provide an amount of torque that matches the torque demand, as shown at plots 406 and 408. Engine RPM is moderate.

At t1, engine load increases due to, for example, the HEV navigating uphill or a request from the operator to increase vehicle speed. Torque demand increases and lift at the intake valves of both the first and second set of cylinders are increased in response to the higher torque demand. Increasing the intake valve lift at the cylinders increases loading at the cylinders and torque supply rises to match the torque demand. Engine RPM remains moderate.

At t2, knock is detected at the first set of cylinders. For example, knock may be indicated by one or more knock sensors coupled to the engine or to each cylinder. To alleviate knock at the first set of cylinders, intake valve lift is decreased. Lift at the second set of cylinder is maintained the same. Torque demand continues to rise as engine load increases but the torque supply is reduced due to the reduction in intake valve lift at the first set of cylinders, resulting in a torque shortfall. Engine RPM remains moderate.

At t3, intake valve lift at the second set of cylinders is increased to compensate for the loss of torque. The amount of increased lift may be determined based on predetermined load thresholds for each cylinder of the second set of cylinders. The torque supply increases, lessening the torque shortfall but is unable to match the torque demand as the engine load remains high.

At t4, the engine RPM is actively increased. For example, an electric motor may be activated to decrease a gear ratio of a gearing of the HEV. The increase in engine rotation provides additional torque, allowing the torque supply to meet the torque demand. The amount of intake valve lift at the first and second set of cylinders remains unchanged.

The operations shown in FIG. 4 depict a scenario where the cylinders not exhibiting knock, e.g., the second set of cylinders, are sufficiently below their respective load thresholds to partially offset the torque demand. The remaining torque shortfall is compensated for by increasing engine RPM. However, knock mitigating actions may be varied in other examples. For example, the vehicle may not be an HEV, or an amount of knock experienced at one or more cylinders may be controlled by a combination of actions, including adjusting valve lift and adjusting spark timing. Example variations in engine operations to control knock are illustrated in FIG. 5, in graph 500.

Graph 500 illustrates operations in an engine with four cylinders adapted with a CVVL mechanism, including load at a first cylinder at plot 502, load at a second cylinder at plot 504, load at a third cylinder at plot 506, and load at a fourth cylinder at plot 508. Load thresholds, at or above which knock is likely to occur, at shown for each of the first, second, third, and fourth cylinders at plots 510, 512, 514, and 516, respectively. Graph 500 also includes an estimated torque demand at plot 518, an estimated torque supply at plot 520, spark timing at the first cylinder at plot 522, spark timing at the second cylinder at plot 524, spark timing at the third cylinder at plot 526, and spark timing at the fourth cylinder at plot 528. Spark timing is depicted to vary between MBT and delayed ignition along the vertical axis. Time is plotted along the horizontal axis.

Prior to t1, cylinder loads (plots 502, 504, 506, 508) are below their respective thresholds (plots 510, 512, 514, 516). The cylinders may be below their respective thresholds by different amounts, however. For example, cylinder 4 may be further below its load threshold than cylinder 1. Torque supply (plot 520) matches torque demand (plot 518) and spark timing is at MBT for all cylinders.

At t1, the torque demand increases, causing torque supply to initially fall short. Intake valve lift at all four cylinders is increased, resulting in higher cylinder loads. Spark timing remains at MBT for all cylinders.

At t2, the increased loading at the cylinders allows the torque supply to meet the torque demand. However, the load at the first cylinder reaches the load threshold, resulting in detection of knock or an increase in likelihood of knock occurring. In response to detection of knock at the first cylinder, intake valve lift at the first cylinder is decreased, reducing loading at the cylinder to below the load threshold. The torque demand increases between t2 and t3 but the torque supply initially falls short of the demand due to the reduced loading at the first cylinder. However, loading at the second, third and fourth cylinders increases by increasing intake valve lift, while maintaining the loads below their respective thresholds between t2 and t3, enabling the torque supply to meet the demand. Spark timing remains at MBT for all cylinders.

At t3, the load at the second cylinder approaches the load threshold. For example, the second cylinder may be within a margin of the load threshold where occurrence of knock at the second cylinder begins or is imminent. Although decreasing intake valve lift at the second cylinder to reduce loading may mitigate knock at the second cylinder, torque supply may be reduced as a result. In addition, increasing loading at the third and fourth cylinders to offset the loss of torque may cause both cylinders to reach their respective load thresholds, increasing a likelihood of knock at three of the four cylinders. In order to mitigate knock at the second cylinder without adversely affecting torque supply, intake valve lift at the first cylinder may be increased while slightly decreasing intake valve lift at the second cylinder so as to affect torque supply minimally. The likelihood of knock at the first cylinder, however, is augmented.

At t4, in order to mitigate knock at the first cylinder, spark ignition for the first cylinder is adjusted by retarding spark (plot 522). Retarding spark at the first cylinder decreases the load at the first cylinder to below the load threshold and outside of a margin of the load threshold. Spark ignition is also delayed at the second cylinder (plot 524) but to a lesser extent. The load at the second cylinder is similarly decreased to be below and outside of the margin of the load threshold. The torque demand remains relatively constant and sufficient torque is supplied by loading at the cylinders to meet the demand. However, a fuel economy of the vehicle may be reduced due to spark ignition delay at the first and second cylinders.

In this way, engine knock may be controlled without adversely affecting a fuel economy of a vehicle. As an alternative to delaying spark ignition, an engine adapted with a CVVL mechanism may selectively adjust intake valve lift at the engine's cylinders to mitigate knock and compensate for a loss of torque resulting from a decrease in loading at the affected cylinder(s). By increasing intake valve lift at cylinders not exhibiting knock, an air-to-fuel ratio at the engine may be maintained at stoichiometry and fuel is not wasted. Furthermore, when the vehicle is a HEV, a gearing of the HEV may be adjusted to increase engine rotation to further compensate for a torque shortfall.

The technical effect of controlling knock by adjusting intake valve lift via the CVVL mechanism is that stoichiometry at the engine and a fuel economy of the vehicle are maintained.

The disclosure also provides support for a method comprising: decreasing intake valve lift at a first set of cylinders of an engine where knock is detected, and increasing intake valve lift at a second set of cylinders of the engine where knock is not detected. In a first example of the method, the first set of cylinders includes one or more cylinders and wherein decreasing intake valve lift at the first set of cylinders includes adjusting a lift height of intake valves of the first set of cylinders via a continuously variable valve lift (CVVL) mechanism coupled to the first and the second sets of cylinders to reduce an amount of intake air delivered to the first set of cylinders. In a second example of the method, optionally including the first example, the second set of cylinders includes one or more cylinders and wherein increasing intake valve lift at the second set of cylinders includes adjusting a lift height of the intake valves of the second set of cylinders via the CVVL mechanism to increase an amount of intake air delivered to the second set of cylinders. In a third example of the method, optionally including the first and second examples, adjusting the lift height of the intake valves of the first and the second sets of cylinders includes increasing the amount of the intake air delivered to the second set of cylinders in proportion to decreasing the amount of the intake air delivered to the first set of cylinders. In a fourth example of the method, optionally including the first through third examples, increasing the amount of the intake air delivered to the second set of cylinders includes dividing an amount of additional intake air equally amongst each cylinder of the second set of cylinders. In a fifth example of the method, optionally including the first through fourth examples, increasing the amount of the intake air delivered to the second set of cylinders includes increasing valve lift more at cylinders of the second set of cylinders with load points further below their respective maximum load thresholds than cylinders of the second set of cylinders with loads points closer to their respective maximum load thresholds. In a sixth example of the method, optionally including the first through fifth examples, decreasing intake valve lift at the first set of cylinders and increasing intake valve lift at the second set of cylinders includes maintaining a stoichiometric air-to-fuel ratio at the engine. In a seventh example of the method, optionally including the first through sixth examples, detecting knock includes detecting knock by one or more knock sensors coupled to the each of the first and the second sets of cylinders.

The disclosure also provides support for a method for a hybrid electric vehicle (HEV), comprising: decreasing intake valve lift at a first set of cylinders exhibiting knock, increasing intake valve lift at a second set of cylinders not exhibiting knock, and adjusting a gearing of the HEV in response to determination of a torque shortfall to increase rotation of an engine. In a first example of the method, the method further comprises: reducing an amount of fuel injected at the first set of cylinders to maintain a stoichiometric air-to-fuel ratio at the first set of cylinders when the intake valve lift is decreased. In a second example of the method, optionally including the first example, the method further comprises: estimating if an increase in loading at the second set of cylinders provides an amount of torque to offset a loss of torque resulting from a decrease in loading at the first set of cylinders to meet a torque demand. In a third example of the method, optionally including the first and second examples, adjusting the gearing includes operating an electric motor and changing a gear ratio to increase engine rotation when increasing intake valve lift at the second set of cylinders does not provide sufficient torque to meet the torque demand. In a fourth example of the method, optionally including the first through third examples, the method further comprises: performing mitigating actions when adjusting the gearing does not meet the torque demand. In a fifth example of the method, optionally including the first through fourth examples, performing mitigating actions includes adjusting a spark timing at each cylinder of the first set and the second set of cylinders according to a difference between a load point and a load threshold of each cylinder. In a sixth example of the method, optionally including the first through fifth examples, performing mitigating actions includes adjusting a throttle position in an intake passage of the hybrid electric vehicle. In a seventh example of the method, optionally including the first through sixth examples, the method further comprises: retarding spark when knock is detected at all cylinders of both the first set and the second set of cylinders.

The disclosure also provides support for an engine, comprising: a plurality of cylinders receiving intake air from an intake manifold of the engine, the plurality of cylinders including a first set of cylinders and a second set of cylinders, a continuously variable valve lift mechanism coupled to the plurality of cylinders and configured to adjust a lift height of intake valves of each of the plurality of cylinders, and a controller including executable instructions stored in non-transitory memory causing the controller to: decrease the lift height of the intake valves at the first set of cylinders and increase the lift height of the intake valves at the second set of cylinders in response to detection of knock at the first set of cylinders. In a first example of the system, the controller is configured to estimate an amount of torque loss due to decreasing the lift height of the intake valves at the first set of cylinders and increase the lift height of the intake valves at the second set of cylinders to offset the torque loss. In a second example of the system, optionally including the first example, the engine is implemented in a hybrid electric vehicle (HEV) and wherein the controller is configured to adjust a gearing of the HEV to increase engine rotation when increasing the lift height of the intake valves at the second set of cylinders is insufficient to offset the torque loss. In a third example of the system, optionally including the first and second examples, a stoichiometric air-to-fuel ratio is maintained at the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   decreasing intake valve lift at a first set of cylinders of an engine where knock is detected; and
   increasing intake valve lift at a second set of cylinders of the engine where knock is not detected.

2. The method of claim 1, wherein the first set of cylinders includes one or more cylinders and wherein decreasing intake valve lift at the first set of cylinders includes adjusting a lift height of intake valves of the first set of cylinders via a continuously variable valve lift (CVVL) mechanism coupled to the first and the second sets of cylinders to reduce an amount of intake air delivered to the first set of cylinders.

3. The method of claim 2, wherein the second set of cylinders includes one or more cylinders and wherein increasing intake valve lift at the second set of cylinders includes adjusting a lift height of the intake valves of the second set of cylinders via the CVVL mechanism to increase an amount of intake air delivered to the second set of cylinders.

4. The method of claim 3, wherein adjusting the lift height of the intake valves of the first and the second sets of cylinders includes increasing the amount of the intake air delivered to the second set of cylinders in proportion to decreasing the amount of the intake air delivered to the first set of cylinders.

5. The method of claim 4, wherein increasing the amount of the intake air delivered to the second set of cylinders includes dividing an amount of additional intake air equally amongst each cylinder of the second set of cylinders.

6. The method of claim 4, wherein increasing the amount of the intake air delivered to the second set of cylinders includes increasing valve lift more at cylinders of the second set of cylinders with load points further below their respective maximum load thresholds than cylinders of the second set of cylinders with loads points closer to their respective maximum load thresholds.

7. The method of claim 4, wherein decreasing intake valve lift at the first set of cylinders and increasing intake valve lift at the second set of cylinders includes maintaining a stoichiometric air-to-fuel ratio at the engine.

8. The method of claim 1, wherein detecting knock includes detecting knock by one or more knock sensors coupled to the each of the first and the second sets of cylinders.

9. A method for a hybrid electric vehicle (HEV), comprising:
   decreasing intake valve lift at a first set of cylinders exhibiting knock;
   increasing intake valve lift at a second set of cylinders not exhibiting knock; and
   adjusting a gearing of the HEV in response to determination of a torque shortfall to increase rotation of an engine.

10. The method of claim 9, further comprising reducing an amount of fuel injected at the first set of cylinders to maintain a stoichiometric air-to-fuel ratio at the first set of cylinders when the intake valve lift is decreased.

11. The method of claim 9, further comprising estimating if an increase in loading at the second set of cylinders provides an amount of torque to offset a loss of torque resulting from a decrease in loading at the first set of cylinders to meet a torque demand.

12. The method of claim 11, wherein adjusting the gearing includes operating an electric motor and changing a gear ratio to increase engine rotation when increasing intake valve lift at the second set of cylinders does not provide sufficient torque to meet the torque demand.

13. The method of claim 12, further comprising performing mitigating actions when adjusting the gearing does not meet the torque demand.

14. The method of claim 13, wherein performing mitigating actions includes adjusting a spark timing at each cylinder of the first set and the second set of cylinders according to a difference between a load point and a load threshold of each cylinder.

15. The method of claim 13, wherein performing mitigating actions includes adjusting a throttle position in an intake passage of the hybrid electric vehicle.

16. The method of claim 9, further comprising retarding spark when knock is detected at all cylinders of both the first set and the second set of cylinders.

17. An engine, comprising:
   a plurality of cylinders receiving intake air from an intake manifold of the engine, the plurality of cylinders including a first set of cylinders and a second set of cylinders;
   a continuously variable valve lift mechanism coupled to the plurality of cylinders and configured to adjust a lift height of intake valves of each of the plurality of cylinders; and
   a controller including executable instructions stored in non-transitory memory causing the controller to:
      decrease the lift height of the intake valves at the first set of cylinders and increase the lift height of the intake valves at the second set of cylinders in response to detection of knock at the first set of cylinders.

18. The engine of claim 17, wherein the controller is configured to estimate an amount of torque loss due to decreasing the lift height of the intake valves at the first set of cylinders and increase the lift height of the intake valves at the second set of cylinders to offset the torque loss.

19. The engine of claim 18, wherein the engine is implemented in a hybrid electric vehicle (HEV) and wherein the controller is configured to adjust a gearing of the HEV to increase engine rotation when increasing the lift height of the intake valves at the second set of cylinders is insufficient to offset the torque loss.

20. The engine of claim 17, wherein a stoichiometric air-to-fuel ratio is maintained at the engine.

\* \* \* \* \*